(12) United States Patent
Garvin (10) Patent No.: US 10,971,904 B2
(45) Date of Patent: Apr. 6, 2021

(54) JUNCTION BOX WITH UNIVERSAL FITMENT ARTICULATING COVER

(71) Applicant: Southwire Company, LLC, Carrollton, GA (US)

(72) Inventor: Barton L. Garvin, Western Springs, IL (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 15/788,675

(22) Filed: Oct. 19, 2017

(65) Prior Publication Data

US 2018/0109082 A1 Apr. 19, 2018

Related U.S. Application Data

(60) Provisional application No. 62/410,314, filed on Oct. 19, 2016.

(51) Int. Cl.
| | | |
|---|---|---|
| H02B 1/48 | (2006.01) | |
| H02G 3/12 | (2006.01) | |
| H02G 3/08 | (2006.01) | |
| H02B 1/34 | (2006.01) | |

(52) U.S. Cl.
CPC .................. *H02B 1/48* (2013.01); *H02B 1/34* (2013.01); *H02G 3/081* (2013.01); *H02G 3/121* (2013.01)

(58) Field of Classification Search
CPC . H02B 1/48; H02B 1/34; H02G 3/081; H02G 3/121; H02G 3/14; H02G 3/12; H02G 3/16

USPC ................... 174/530, 50, 66, 58, 67
See application file for complete search history.

(56) References Cited

U.S. PATENT DOCUMENTS

| | | | | |
|---|---|---|---|---|
| 2,047,640 A | * | 7/1936 | Lauer ........................ | H02G 3/14 220/3.7 |
| 3,864,511 A | * | 2/1975 | Morby ...................... | H02G 3/10 174/58 |
| 3,956,573 A | * | 5/1976 | Myers ..................... | H02G 3/185 174/488 |
| 3,983,311 A | * | 9/1976 | Brumfield .............. | H02G 3/083 174/50 |
| 4,449,015 A | * | 5/1984 | Hotchkiss ................ | H02G 3/10 174/138 F |
| 4,593,960 A | * | 6/1986 | Millhimes ............ | H01R 13/447 439/131 |
| 4,873,396 A | * | 10/1989 | Guity-Mehr ............. | H02G 3/14 174/66 |

(Continued)

*Primary Examiner* — Binh B Tran
*Assistant Examiner* — Muhammed Azam
(74) *Attorney, Agent, or Firm* — Merchant & Gould P.C.

(57) ABSTRACT

The present invention is an electrical junction box comprising a walled enclosure having an articulating cover member. The articulating cover member has an opening and is configured to allow an electrical device such as switch to be coupled to the cover member and further reside within the electrical junction box when the cover member is articulated into a closed position. When the cover member is in an open position, an installer has access to the backside of the electrical device and to the inside of the junction box. The coupling to of the electrical device to the cover member allows for support and stability of the electrical device while installing the required electrical lines that run through the junction box to the electrical device.

13 Claims, 5 Drawing Sheets

(56) References Cited

U.S. PATENT DOCUMENTS

| | | | | |
|---|---|---|---|---|
| 4,915,638 A * | 4/1990 | Domian | | H01R 13/447 |
| | | | | 174/67 |
| 4,979,634 A * | 12/1990 | Begley | | H01H 9/287 |
| | | | | 16/267 |
| 5,098,046 A * | 3/1992 | Webb | | H02G 3/128 |
| | | | | 174/503 |
| 5,224,673 A * | 7/1993 | Webb | | H02G 3/128 |
| | | | | 174/503 |
| 5,263,676 A * | 11/1993 | Medlin, Jr. | | H02G 3/126 |
| | | | | 220/3.6 |
| 5,272,297 A * | 12/1993 | Reichow | | H02B 1/48 |
| | | | | 200/293 |
| 5,280,135 A * | 1/1994 | Berlin | | H02G 3/14 |
| | | | | 174/67 |
| 5,317,108 A * | 5/1994 | Prairie, Jr. | | H02G 3/14 |
| | | | | 174/67 |
| 5,449,860 A * | 9/1995 | Buckshaw | | H02G 3/14 |
| | | | | 174/67 |
| 5,477,010 A * | 12/1995 | Buckshaw | | H02G 3/14 |
| | | | | 174/67 |
| 5,627,340 A * | 5/1997 | Smith | | H02G 3/185 |
| | | | | 174/482 |
| 5,682,017 A * | 10/1997 | Marrotte | | H02G 3/086 |
| | | | | 174/53 |
| 5,877,450 A * | 3/1999 | Quin | | H02G 3/14 |
| | | | | 174/66 |
| 5,931,325 A * | 8/1999 | Filipov | | H02G 3/081 |
| | | | | 174/57 |
| 6,184,468 B1 | 2/2001 | Speziale | | 174/66 |
| 6,276,962 B1 * | 8/2001 | Gaines | | H02G 3/14 |
| | | | | 174/66 |
| 6,479,749 B1 * | 11/2002 | Vrame | | H02G 3/14 |
| | | | | 174/58 |
| 6,583,359 B1 * | 6/2003 | Cabello-Colon | | H02G 3/14 |
| | | | | 174/55 |
| 6,642,453 B2 * | 11/2003 | Shotey | | H02G 3/081 |
| | | | | 174/53 |
| 7,205,488 B2 * | 4/2007 | Riner | | H02G 3/185 |
| | | | | 174/481 |
| D555,108 S * | 11/2007 | Strong | | D13/173 |
| 7,396,996 B1 * | 7/2008 | Shotey | | H02G 3/14 |
| | | | | 174/67 |
| 7,459,632 B2 * | 12/2008 | Bowman | | E04F 19/083 |
| | | | | 174/482 |
| 7,462,777 B2 * | 12/2008 | Dinh | | H01R 13/5213 |
| | | | | 174/58 |
| 7,468,486 B2 * | 12/2008 | Yan | | H02G 3/123 |
| | | | | 174/50 |
| 7,479,598 B1 * | 1/2009 | Shotey | | H02G 3/14 |
| | | | | 174/135 |
| 7,683,257 B1 * | 3/2010 | Shotey | | H02G 3/14 |
| | | | | 174/66 |
| 7,718,893 B2 | 5/2010 | Purves et al. | | 174/53 |
| 7,763,798 B1 * | 7/2010 | Shotey | | H02G 3/14 |
| | | | | 174/66 |
| 8,097,805 B2 * | 1/2012 | Drane | | H02G 3/185 |
| | | | | 174/50 |
| 8,610,004 B2 * | 12/2013 | Solan | | H02G 3/123 |
| | | | | 174/50 |
| 8,779,288 B1 * | 7/2014 | Baldwin | | H02G 3/14 |
| | | | | 174/66 |
| 9,444,179 B1 * | 9/2016 | Elbaz | | H01R 13/5213 |
| 9,480,180 B1 * | 10/2016 | Thompson | | H01M 10/465 |
| 9,595,819 B1 * | 3/2017 | Bonino | | H02G 3/088 |
| 10,411,450 B2 * | 9/2019 | Dinh | | H02G 3/086 |
| 2002/0050383 A1 * | 5/2002 | Westlake | | H02G 3/14 |
| | | | | 174/66 |
| 2002/0062550 A1 * | 5/2002 | Manning | | H02G 3/14 |
| | | | | 29/745 |
| 2003/0037952 A1 * | 2/2003 | Wilson | | B28D 1/005 |
| | | | | 174/66 |
| 2003/0051894 A1 * | 3/2003 | Westlake | | H02G 3/14 |
| | | | | 174/66 |
| 2003/0066674 A1 * | 4/2003 | Shotey | | H02G 3/081 |
| | | | | 174/66 |
| 2003/0106703 A1 * | 6/2003 | Wilson | | B24B 41/068 |
| | | | | 174/66 |
| 2003/0178421 A1 * | 9/2003 | Almond | | H02G 3/383 |
| | | | | 220/3.8 |
| 2004/0110407 A1 * | 6/2004 | Culbertson | | H01R 13/73 |
| | | | | 439/367 |
| 2004/0144556 A1 * | 7/2004 | Dinh | | H02G 3/14 |
| | | | | 174/67 |
| 2006/0048964 A1 * | 3/2006 | Rick | | H02G 3/126 |
| | | | | 174/66 |
| 2007/0128915 A1 * | 6/2007 | Castaldo | | H01R 13/6395 |
| | | | | 439/328 |
| 2008/0011503 A1 * | 1/2008 | Dinh | | H02G 3/14 |
| | | | | 174/53 |
| 2008/0110661 A1 * | 5/2008 | Dinh | | H02G 3/088 |
| | | | | 174/53 |
| 2008/0144285 A1 * | 6/2008 | Cox | | H02G 3/081 |
| | | | | 361/699 |
| 2008/0179073 A1 * | 7/2008 | Drane | | H02G 3/088 |
| | | | | 174/67 |
| 2008/0179087 A1 * | 7/2008 | De Ambroggi | | H02G 3/12 |
| | | | | 174/559 |
| 2008/0223600 A1 * | 9/2008 | Magno | | H02G 3/14 |
| | | | | 174/66 |
| 2008/0236859 A1 * | 10/2008 | de la Borbolla | | H02G 3/14 |
| | | | | 174/66 |
| 2009/0038842 A1 * | 2/2009 | Peck | | H02G 3/185 |
| | | | | 174/482 |
| 2009/0084782 A1 * | 4/2009 | Helmer | | H02G 3/088 |
| | | | | 220/3.8 |
| 2009/0169165 A1 * | 7/2009 | Belcher | | H02G 3/083 |
| | | | | 385/135 |
| 2009/0211778 A1 * | 8/2009 | Drane | | H02G 3/14 |
| | | | | 174/67 |
| 2009/0301776 A1 * | 12/2009 | Garvin | | H02G 3/085 |
| | | | | 174/535 |
| 2010/0025066 A1 * | 2/2010 | de la Borbolla | | H02G 3/18 |
| | | | | 174/57 |
| 2010/0108375 A1 * | 5/2010 | Richter | | H01R 13/6641 |
| | | | | 174/520 |
| 2010/0178784 A1 * | 7/2010 | Shimizu | | H01R 4/64 |
| | | | | 439/95 |
| 2010/0218969 A1 * | 9/2010 | Purves | | H02G 3/12 |
| | | | | 174/59 |
| 2012/0031640 A1 * | 2/2012 | Korcz | | H02G 3/20 |
| | | | | 174/66 |
| 2012/0152587 A1 * | 6/2012 | Lemire | | H02G 3/14 |
| | | | | 174/66 |
| 2013/0248243 A1 * | 9/2013 | Dinh | | H02G 3/086 |
| | | | | 174/535 |
| 2013/0312997 A1 * | 11/2013 | Korte | | H02G 3/081 |
| | | | | 174/56 |
| 2013/0319715 A1 * | 12/2013 | Korcz | | H02G 3/08 |
| | | | | 174/50 |
| 2014/0305671 A1 * | 10/2014 | Cwieka | | H02G 3/18 |
| | | | | 174/66 |
| 2014/0367136 A1 * | 12/2014 | Trojanowski | | H02G 3/14 |
| | | | | 174/66 |
| 2015/0083454 A1 * | 3/2015 | Michaelis, IV | | H02G 3/14 |
| | | | | 174/66 |
| 2016/0359304 A1 * | 12/2016 | Troia | | H02G 3/14 |
| 2017/0047717 A1 * | 2/2017 | Thomas | | H02G 3/088 |
| 2017/0085069 A1 * | 3/2017 | Bonino | | H02G 3/088 |
| 2017/0133831 A1 * | 5/2017 | Buhl | | H02G 3/22 |
| 2018/0048132 A1 * | 2/2018 | Dinh | | H05K 5/0226 |
| 2018/0109082 A1 * | 4/2018 | Garvin | | H02B 1/34 |
| 2018/0241187 A1 * | 8/2018 | Korcz | | H02G 3/121 |
| 2018/0241188 A1 * | 8/2018 | Korcz | | H02G 3/121 |
| 2018/0294631 A1 * | 10/2018 | Segro | | H02G 3/10 |

(56) References Cited

U.S. PATENT DOCUMENTS

2019/0348829 A1* 11/2019 Davis ................... H02H 3/08
2019/0386420 A1* 12/2019 McDonald ........... H01R 13/447
2020/0194983 A1* 6/2020 Korcz .................. H02G 3/125

* cited by examiner

JUNCTION BOX WITH UNIVERSAL FITMENT ARTICULATING COVER

CROSS-REFERENCE TO RELATED APPLICATIONS

This Application claims priority to U.S. Patent Provisional Application Ser. No. 62/410,314 filed Oct. 19, 2016, which is herein incorporated by reference in its entirety.

BACKGROUND OF THE INVENTION

The present invention generally relates to electrical junction boxes, covers therefore and device or plaster rings. More particularly, the present invention relates to an electrical junction box and an articulating or hinged cover that is configured for a universal fit across multiple different configurations of device or plaster rings. The electrical junction box of the present invention is adapted to permit efficient installation of an electrical device as well as providing serviceability access to the junction box without having to remove the already installed device or device ring.

Junction boxes are used to harness electrical wiring from a breaker and further relay that electrical wiring to electrical devices including but not limited to power outlets, switches, electrical fixtures, such as fan or lighting fixtures, thermostats, and smoke/CO detectors. Device rings, also known in the art as plaster or mud rings, are commercially available in a wide variety of configurations. In accordance with the present invention, the inventive junction box may or may not have an attached device ring for fixture mounting.

In a building or home, electrical wiring is typically run from a circuit breaker through conduit into one or more junction boxes, where an electrical device will be installed. The junction box is typically installed into the wall and either anchored to the drywall or nearby stud. The electrical device is then wired to the circuit breaker through the harnessed electrical wiring and then mounted either directly to the junction box or via a device ring designed to hold the electrical device in place. Once the electrical device is installed, depending on where the junction box is installed, a cosmetic cover may be further mounted to the junction box and device ring.

An installer may need to test the electrical device to see if it is wired properly at various stages before the installation of the electrical device is complete. For example, the installer may turn the circuit on after the electrical device is initially wired to ensure the proper connections were made. The installer will likely turn the circuit breaker off and mount the electrical device to the junction box or to the device ring and to the junction box, turn the circuit breaker back on, and test the electrical device again before installing cosmetic cover. If the wiring comes loose or is improperly installed during any of these steps, the installer is forced to go through the tedious and time consuming process of unmounting the electrical device or device ring, or both, rechecking the wiring, remounting the electrical device, and retesting the mounted electrical device. In some instances the covers and device rings for existing junction boxes are too tall and push against the drywall creating the undesirable appearance of drywall bulge.

The present invention addresses the issue of continually mounting and unmounting electrical devices during installation or repair by providing a junction box designed to allow an electrical device to be mounted in its final position while allowing the installer access to the necessary wiring.

SUMMARY OF THE INVENTION

In view of the above, an electrical junction box comprising an articulating cover such that an electrical device may be installed and repaired without removing the electrical device or cover is provided.

The advantage of the present invention is that it allows installers the ability to test the installed device without having to take the time consuming steps of removing the cover or device ring, removing the electrical device, checking the wiring, remounting the electrical device, and rechecking the functionality of the electrical device. The installer is likely to save time and save the end customer money by avoiding these steps.

In one aspect of the invention, the electrical junction box comprises a walled enclosure with a rear end bound by a baseplate and a front end bound by a cover member. The walled enclosure may further comprise at least one opening or knockout configured to accommodate conduit or electrical wiring. The cover member is rotatably coupled to the walled enclosure such that in a first rotated state the front end of the walled enclosure is bound by the cover, and in a second rotated state the front end is open or unbound. The cover member is configured with an opening adapted to accommodate a device ring or an electrical device.

In one aspect of the invention, the cover member may comprise an additional recessed area configured to recess the device ring or electrical device into the electrical junction box.

In another aspect of the invention, the electrical junction box may comprise a common mechanical means as known to one of skill in the art to fix the cover member to the walled enclosure including but not limited to a set screw, a magnet, a snap, or another common type of locking mechanism.

In yet another aspect of the invention, the electrical junction box may further comprise brackets coupled to the walled enclosure or baseplate to further accommodate the installation of the electrical junction box onto a wall stud.

In another aspect of the invention the electrical junction box is part of a system comprising the electrical junction box, electrical wiring, and an electrical to the cover or a device device ring, the device ring coupled to the junction box.

Another aspect of the invention includes a method for installing an electrical device into a junction box. This method includes the steps mounting an electrical device directly to the articulating cover of the electrical junction box, or alternatively to a device ring and mounting the device ring to the articulating cover of the junction box, articulating the cover into an open position such that the device may accessible for the installation of electrical wiring, coupling the electrical wiring to the electrical device, articulating the cover of the junction box into a closed position, and fixing the cover in a closed position.

Another aspect of the invention includes a method for servicing an electrical device installed into a junction box. This method includes the steps unfixing the junction box cover from the junction box, articulating the junction box cover into an open position such that the electrical wiring is accessible, testing, checking or replacing faulty wiring or a faulty electrical device.

The methods, systems, and devices are set forth in part in the description which follows, and in part will be obvious from the description, or can be learned by practice of the methods, devices, and systems. The advantages of the methods, devices, and systems will be realized and attained by means of the elements and combinations particularly pointed out in the appended claims. It is to be understood that both the foregoing general description and the following detailed description are exemplary and explanatory only and are not restrictive of the methods, devices, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE PREFERRED EMBODIMENTS

The foregoing and other features and advantages of the invention will become more apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Figure 1A:
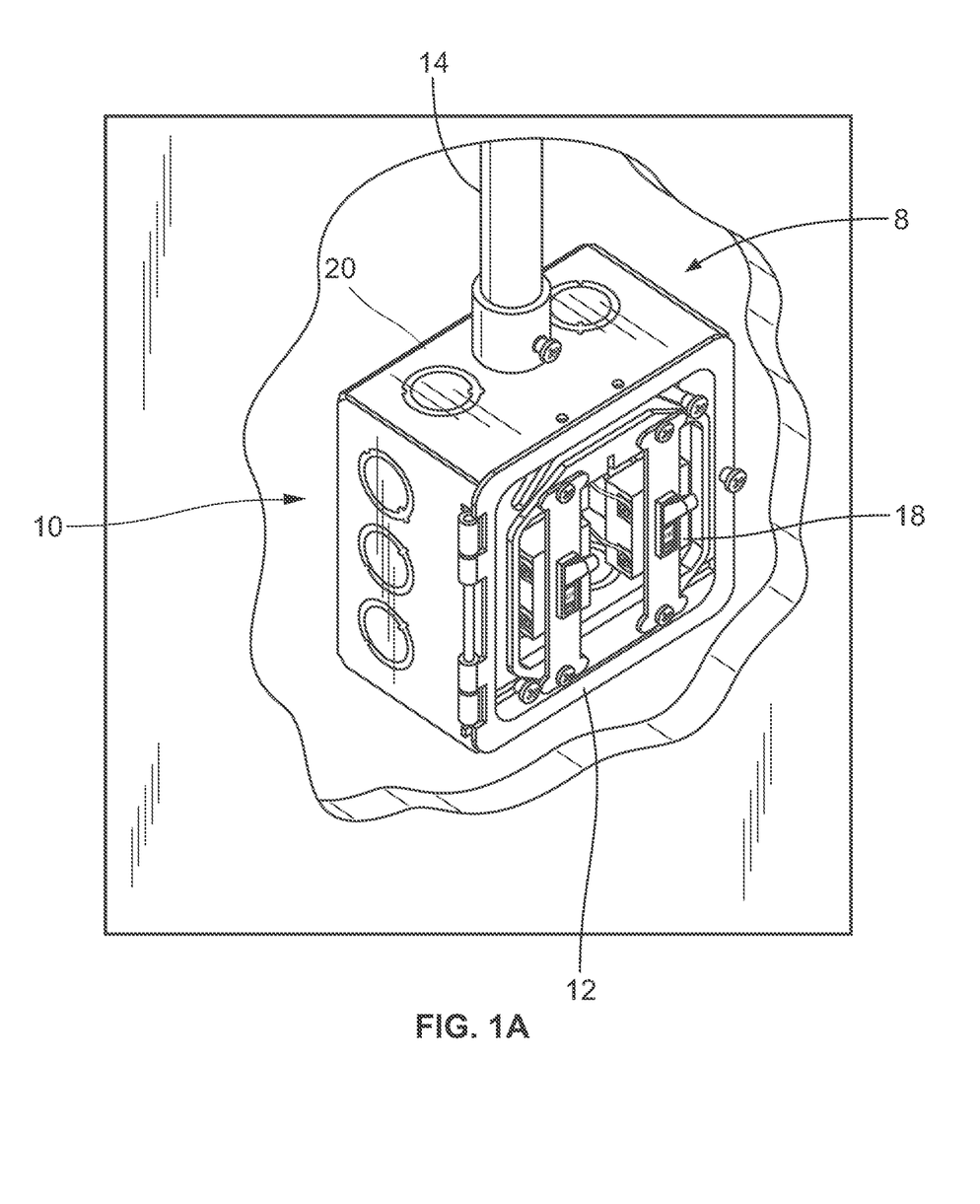
FIG. 1A is a perspective view of an electrical junction box installed into a wall with a cover member in a closed position.
Figure 1B:
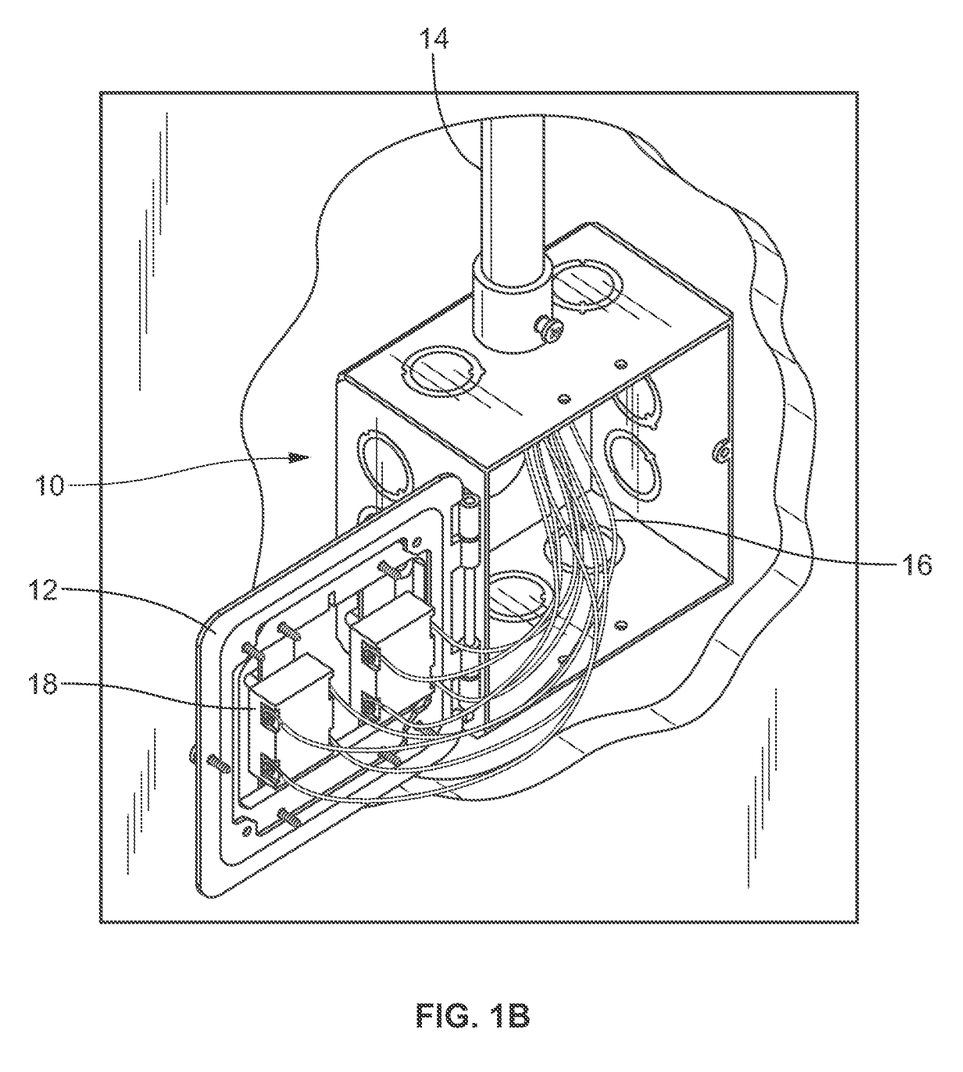
FIG. 1B is a perspective view of the electrical junction box installed in a wall with the cover member in an open position.
Figure 1C:
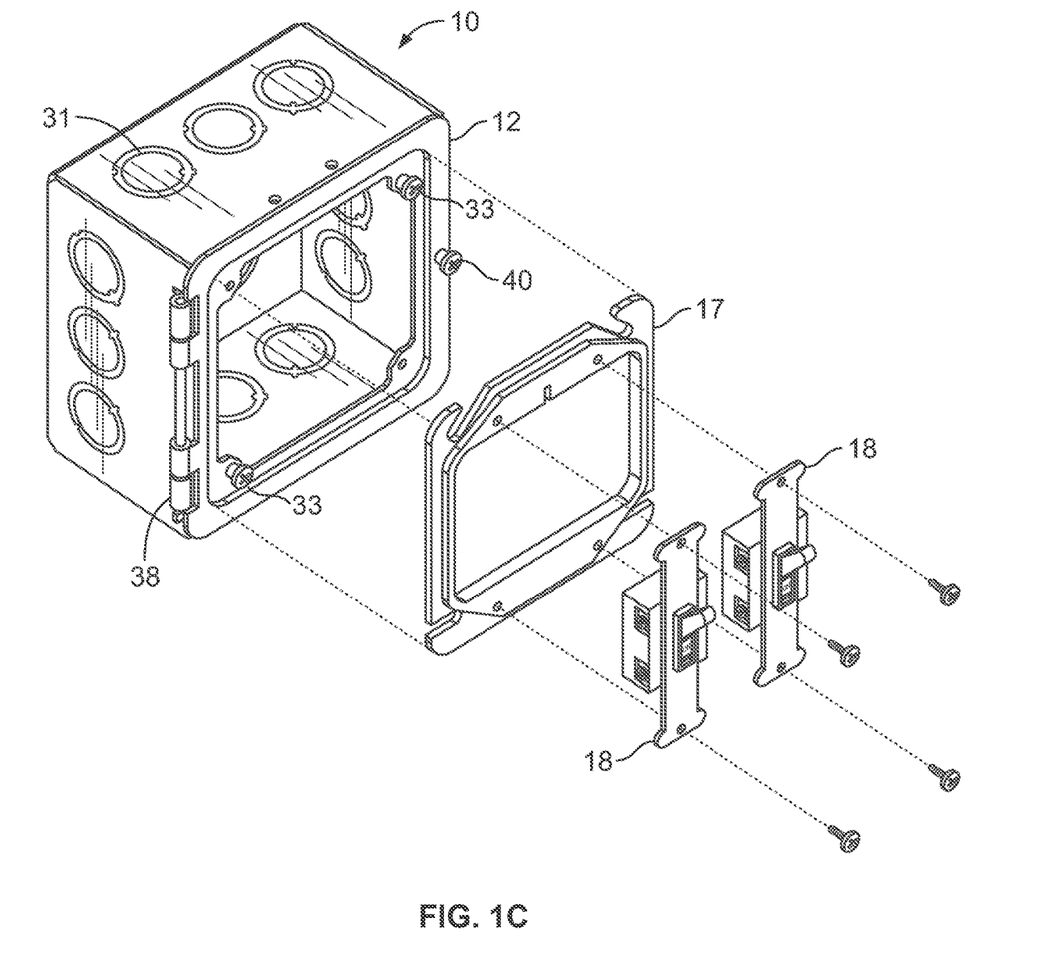
FIG. 1C is an exploded view of the electrical junction with the cover member in a closed position.

FIG. 1A is a perspective view of an electrical junction box system 8 comprising, among other elements, an electrical junction box 10 installed into a wall with a cover member 12 in a closed position. FIG. 1B is a perspective view of the electrical junction box system 8 installed into a wall with the cover member 12 in an open position. In addition to the electrical junction box 10, FIGS. 1A and 1B display other components of the system 8 including but not limited to a conduit 14 coupled to the electrical junction box 10, electrical wiring 16 running through the conduit 14 into the electrical junction box 10 and wired to an electrical device 18. FIG. 1C is an exploded view of system 8 further detailing the attachment of electrical device 18 or device ring 17.

Figure 2A:
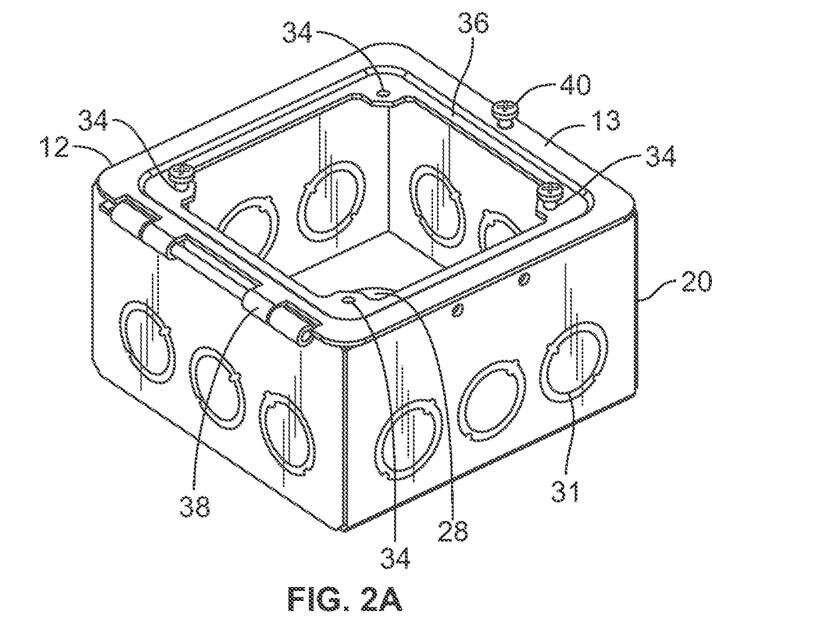
FIG. 2A is a perspective view of the electrical junction box with the cover member in a closed position.
Figure 2B:
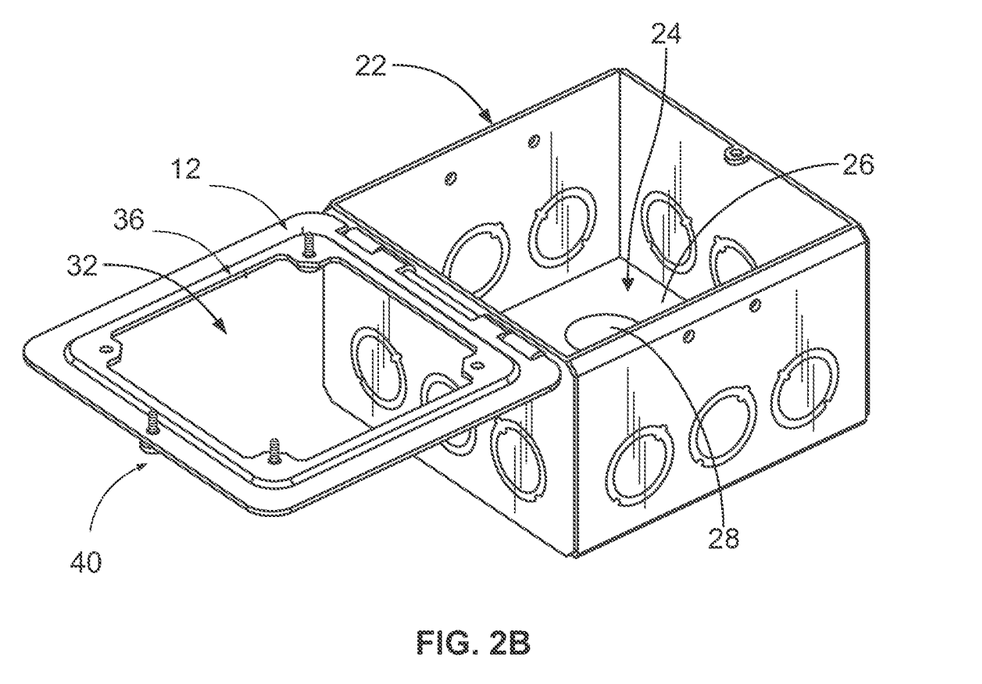
FIG. 2B is a perspective view of the electrical junction box with the cover member in an open position.

FIGS. 2A and 2B depict a perspective view of the electrical junction box 10 with the cover member 12 in a first closed state and a second open state. The electrical junction box 10 comprises a walled enclosure 20 with a front face 22 and rear face 24. The rear face 24 is bound by a baseplate 26, while the front face 22 is bound by the cover member 12 when the cover member 12 is in the first closed state.

Figure 3:
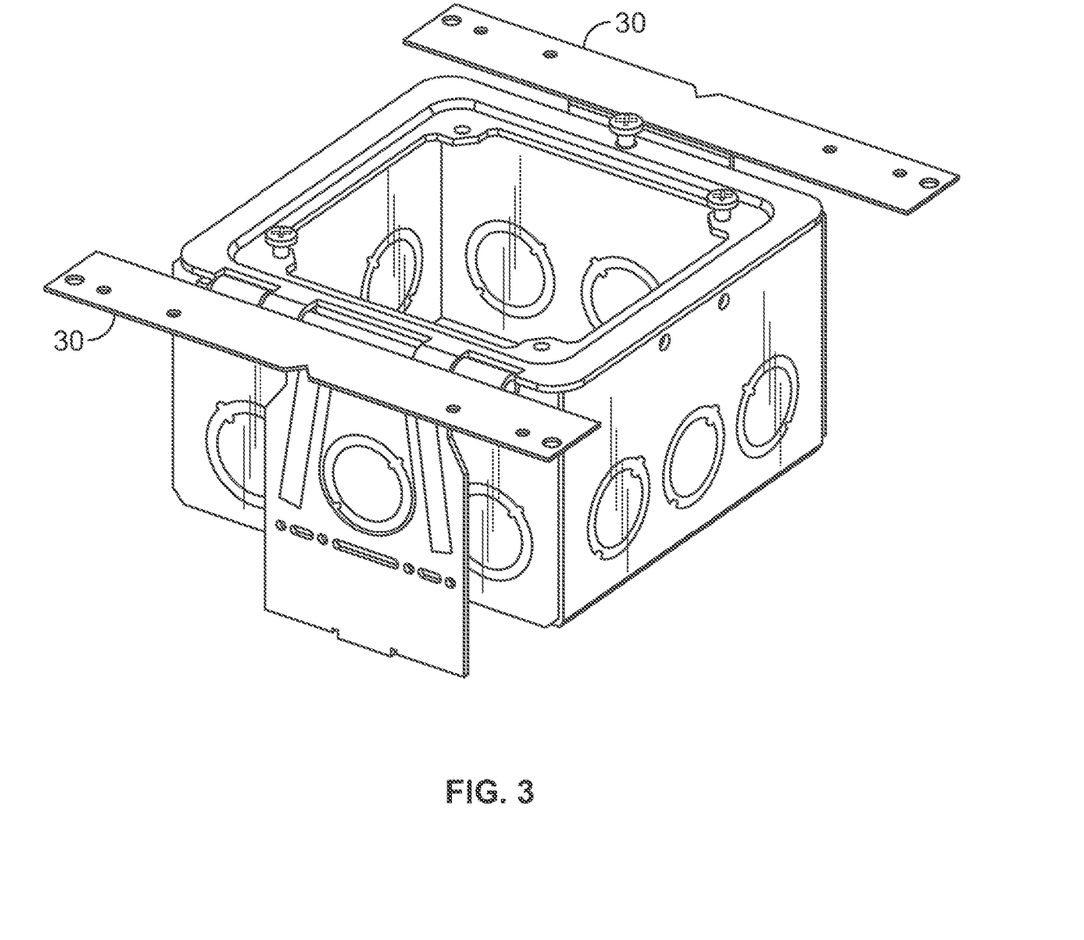
FIG. 3 is a perspective view of an electrical junction box with brackets.

The walled enclosure 20 or baseplate 26 may further comprise at least one opening 28 or knockout 31 adapted to accommodate electrical wiring 16 running from the circuit breaker, or a conduit 14 carrying electrical wiring 16 to the electrical junction box 10 and in turn to the electrical device 18. As shown in FIG. 3, in some embodiments of the electrical junction box 10 additional support brackets 30 may be coupled to the walled enclosure 20. The additional support brackets 30 provide greater flexibility in installing the electrical junction box 10 to wall studs. The support brackets 30 may be angular brackets as shown, or may be in the form of a collar bracket to secure to pipe or other forms of tubing, or even hinged brackets to give greater installation flexibility.

The cover member 12 comprises an opening 32 configured to accommodate a device ring 17 or electrical device 18. The perimeter of the cover member 12 comprises additional smaller openings or threaded openings 34 to further allow a device ring 17 or electrical device 18 to be coupled to and/or aligned with the cover member 12 via common attachment mechanisms 33 including but not limited to set screws, mounting screws, snaps, or tongue and groove mating. In some embodiments, as depicted in FIG. 3, the cover member 12 further comprises a recessed shelf 36 surrounding the perimeter of the opening 32 recessed from a front surface 13 of the cover member 12. As shown in FIGS. 2A and 2B, in a cover member 12 open and closed position, the recessed shelf 36 sits sub-flush the cover member front surface 13. The recessed shelf 36 allows an electrical device 18 or device ring to mount deeper into the electrical junction box 10 and help prevent common installer issues such as drywall bulge.

The cover member 12 of the electrical junction box is rotatably coupled to the walled enclosure 20 having at least two rotation states. In a first rotation state the cover member 12 is disposed over the front face 22 of the walled enclosure 20 and in a second rotation state the cover member 12 is rotated along a vertical axis V such that the front face 22 is at least partially uncovered. In one embodiment, the cover member 12 may be rotatably coupled to the walled enclosure 20 through a hinge mechanism 38. In some embodiments the cover member 12 is additionally secured to the walled enclosure 20 through a common fastening means 40 such including but not limited to a set screw, a snap, or magnet that prevents the cover member 12 from opening without disengaging the fastener first.

The components of electrical junction box 10 such as the walled enclosure 20, the baseplate 26, and the cover member 12 may be comprised of materials common to the industry including but not limited to metals such as steel, stainless steel, or galvanized steel, aluminum or polymers such as ABS, fiberglass, polycarbonate or polystyrene.

A method for installing an electrical device 18 into an electrical junction box 10 may include the steps coupling an electrical device 18 to an articulating cover member 12 of the electrical junction box 10, or alternatively to a device ring and coupling the device ring to the articulating cover member 12 of the electrical junction box 10, articulating the articulating cover member 12 into an open position such that the electrical device 18 may be accessible for the installation of electrical wiring 16, coupling the electrical wiring 16 to the electrical device 18, articulating the articulating cover 12 of the electrical junction box 10 into a closed position, and fixing the articulating cover 12 in a closed position.

A method for servicing an electrical device 18 installed into an electrical junction box 10 may include the steps of uncoupling an articulating cover member 12 from the electrical junction box 10, articulating the articulating cover into an open position such that electrical wiring 16 coupled to the electrical device 18 is accessible, testing, checking or replacing faulty electrical wiring 16 or a faulty electrical device 18.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

The invention claimed is:

1. An electrical junction box comprising:
a walled enclosure having a walled enclosure perimeter, the walled enclosure having a front face and a rear face, wherein the rear face of the walled enclosure is bounded by a baseplate, and wherein the baseplate of the wall enclosure comprises at least one opening or knockout to accommodate electrical wiring or a conduit;
a cover member having a cover member front surface and a cover member front surface opening, the cover member further comprising a recessed shelf that sits sub-flush the cover member front surface, wherein the recessed shelf is recessed into the cover member front surface, the recessed shelf bounded by the cover member opening, the recessed shelf further configured with a plurality of attachment openings to accommodate coupling of a device ring to the cover member; and
a hinge coupled to each of a wall of the wall enclosure and the cover member comprising the recessed shelf that sits sub-flush the cover member front surface, wherein the hinge rotatably couples the cover member to the wall of the walled enclosure such that the cover member covers the front face of the wall enclosure in a closed position state and the cover member, by rotating, uncovers the front face of the walled enclosure exposing a side or rear face of the electrical device in an open position state.

2. The electrical junction box of claim 1 wherein the hinge mechanism is mounted to a top portion of the wall of the walled enclosure at or proximal the front surface of the walled enclosure.

3. The electrical junction box of claim 2 wherein a portion of the cover member is removably coupled through a fastener to the walled enclosure preventing rotation of the cover member.

4. The electrical junction box of claim 3 wherein the portion of the cover member is removably coupled to the walled enclosure by a set screw, a snap, a magnet, or a tongue and groove system.

5. The electrical junction box of claim 1 further comprising at least one bracket coupled to the walled enclosure configured to accommodate a wall stud, pipe, or conduit.

6. The electrical junction box claim 1 wherein the walled enclosure, the baseplate, and the cover member comprises at least one of the following materials: steel, stainless steel, or galvanized steel, aluminum, ABS, fiberglass, polycarbonate, or polystyrene.

7. The electrical junction box system of claim 1 wherein an electrical device is coupled to the device ring and the device ring is coupled to the recessed shelf into the front surface, further wherein the electrical device and device ring rotate along with the cover member.

8. The electrical junction box of claim 7 wherein the electrical device is a power outlet, a switch, a fan, a lighting fixture, a thermostats, a smoke detector, or a carbon monoxide detector.

9. A method for installing an electrical device into an electrical junction box having rotating cover member, wherein a hinge is coupled to each of a wall of the electrical junction box and the rotating cover member, wherein the rotating cover member comprises a cover member front surface and a recessed shelf that sits sub-flush the cover member front surface, the cover member configured to cover and uncover an open front face of the electrical junction box, wherein the recessed shelf is recessed into the cover member front surface, comprising the steps of:
rotating the rotating cover member such that the rotating cover member uncovers the open front face of the electrical junction box;
coupling the electrical device to a device ring and coupling the device ring to the recessed shelf;
coupling electrical wiring through the electrical junction box open front face to an electrical device; and
rotating the rotating cover member into a closed position such that the rotating cover member covers the front face of the electrical junction box.

10. The method of claim 9 further comprising the additional step of coupling the rotating cover member to the electrical junction box to prohibit rotation of the rotating cover member.

11. The method of claim 9 further comprising the steps of rotating the rotating cover member into the open position and servicing or replacing the electrical device.

12. The electrical junction box system of claim 1 wherein an electrical device is coupled to the recessed shelf recessed into the front surface, further wherein the electrical device and the device ring rotate along with the cover member.

13. The electrical junction box system of claim 12 wherein the electrical device is a power outlet, a switch, a fan, a lighting fixture, a thermostat, a smoke detector, or a carbon monoxide detector.

* * * * *